United States Patent Office 3,449,556
Patented June 10, 1969

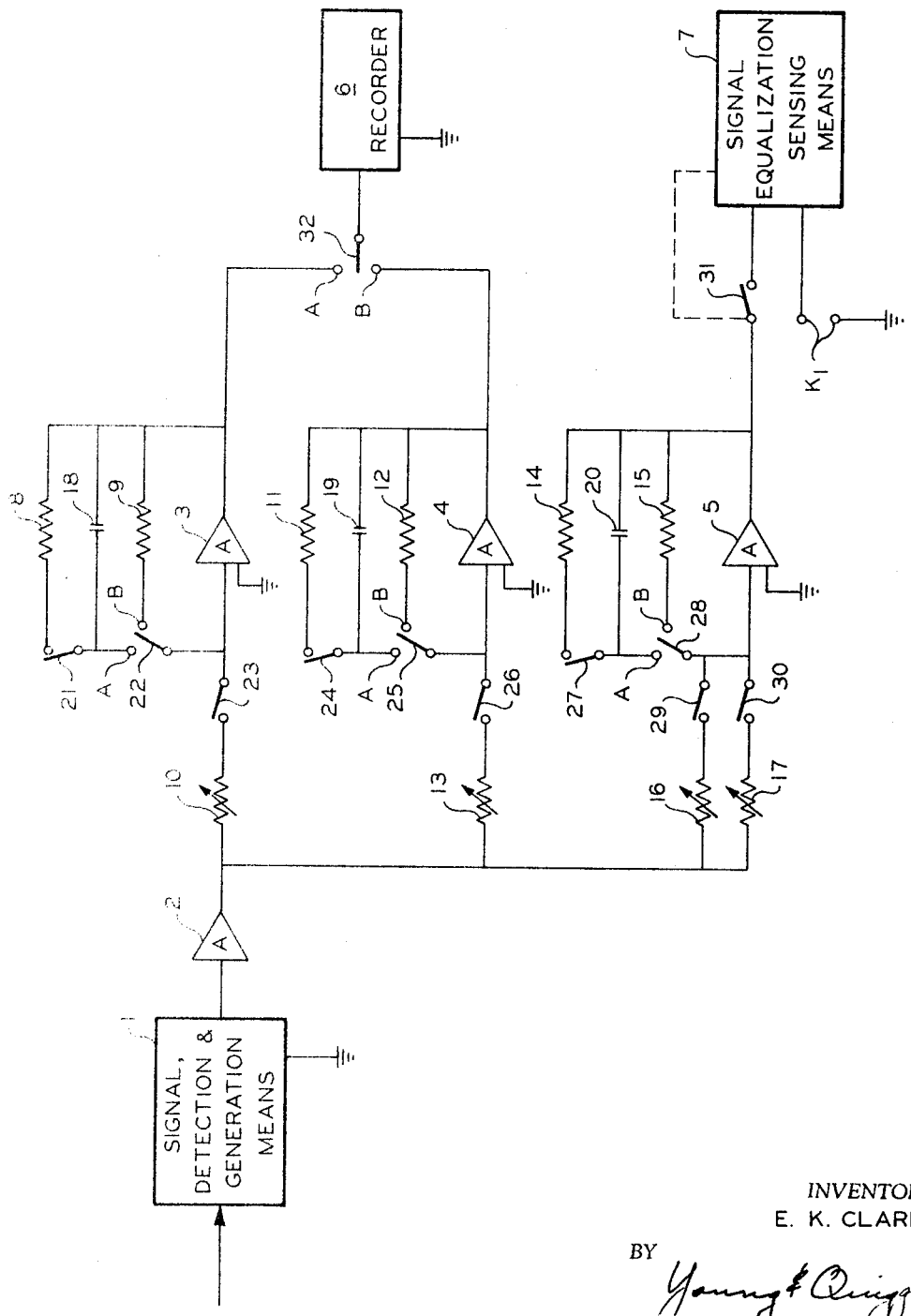

3,449,556
ANALOG COMPUTER FOR DETERMINING THE
PROPORTION OF ONE RESPONSE TO A SUM
OF RESPONSES
Edwin K. Clardy, Bartlesville, Okla., assignor to Phillips
Petroleum Company, a corporation of Delaware
Filed Dec. 19, 1966, Ser. No. 602,622
Int. Cl. G06g 7/14
U.S. Cl. 235—193                                3 Claims This invention relates to an apparatus for determining the proportion a single response bears to a sum of responses.

In many areas of scientific interest it is desirable to ascertain the proportion that one response of a plurality of responses bears to the total of the plurality. Prior art discloses apparatus for determining the proportion one response bears to a total plurality of responses; however, this invention is superior to that of the prior art in that this invention provides an improved apparatus. The apparatus of the invention is an improvement over the prior art in that the inventive apparatus is of simpler construction and operation.

In one embodiment, this invention comprises an apparatus capable of sensing a plurality of responses and determining what portion of the plurality is represented by each individual response. In this embodiment, a chromatographic analyzer was charged with a mixture of two components. The first voltage, representing the output of the first component, was integrated against time and stored in a first and third integration and storage means, the second voltage, representing the output of the second component, was integrated against time and stored in a second and the aforementioned third integration and storage means. The result of these functions is a first integrated voltage stored in a first integration and storage means, a second integrated voltage in a second integration and storage means, and the sum of the first and second integrated voltages stored in the third integration and storage means. All integration and storage means incorporate an RC circuit with identical time decay characteristics. The aforementioned stored integrated voltage values represent the charge in the capacitors. All the integration and storage means are then allowed to decay against ground by allowing voltage to flow back through the third integration and storage means. When the value in the third means decreases to a predetermined value, say 100 or 1.00, then the voltages remaining in the first and second means represent the percentage or the mole fraction of each component. As a result, the percentage or mole fraction can be read directly without the need of performance calculations.

As to a slightly more detailed explanation of the above embodiment, a Gaussian curve, representing a distribution resulting from the quantity of the first component of the binary mixture exiting from the chromatographic column being plotted vs. time, was conducted through two separate but equal resistors and each voltage integrated and stored in a first and third operational amplifier that have each been connected across a separate capacitor. Since the resistors are equal, the voltage drops are equal and the identical value is integrated and subsequently stored in the capacitors of the first and third means. Accordingly, the Gaussian curve, representing the second component, was conducted through two equal resistors and the integrated value stored in the capacitors of a second and the aforementioned integration and storage means. Thus, the first and second means store the first and second values and the third means stores the sum of the first and second values.

The resistors have been chosen so as to substantially correspond to the proportion of each component in the mixture. This was done by first selecting the resistor carrying the first component to be equal and the resistor carrying the second component to be equal, and second, by selecting the resistors so that the ratio of the resistor carrying the first voltage into the first means to the sum of the resistors carrying the first and second voltages into the third means are substantially equivalent to the ratio of the quantity of the first component to the sum of the quantities of the first and second component. Stated another way, the individual resistors must comprise the same percentage of the total resistance as each individual component bears to the sum of all components.

Since all the integration and storage means decay at the same rate when discharged, the proportions that the values in the first and second means bear to the sum of the first and second values are preserved during the decay period.

In order to preserve the above-mentioned proportions once the voltage is removed from the integration and storage means, the voltages flowing from the first and second means is conducted initially back through the resistors are the same proportion as the components, the relationship preserved by the decaying circuits is not destroyed. Subsequently, the values flowing back through the resistors are combined and the combined value allowed to decay through the sum of the resistors between the chromatograph analyzer and the third means. The proportion between the values in the first and second means are also preserved through this function because the combined voltages are placed across the combined resistance representing the resistance through which the first and second voltages originally flowed.

Prior to the decay function but after each operational amplifier and capacitor has integrated and stored the appropriate value, a resistor is switched across the amplifier to prevent the amplifier from drifting and prematurely dissipating a portion of the charge stored in the capacitor.

After the value in the third means representing the sum of the first and third values is allowed to decay to a convenient predetermined level, the decay in all three integration and storage means is terminated whereupon a recorder attached to the circuit senses the remaining value in the first and second means.

According to this invention, the value remaining in the first and second integration and storage means is reflective of the proportion of the first and second component in the binary mixture and the proportion is conveniently represented as percentages, if the decay in the third means is terminated at 100 units, or represented as mole fraction, if the decay termination occurs at 1.00. Any value can be selected for termination of the decay and the values remaining in the first and second means will be readable as a proportion of that value; however, in a preferred embodiment, the decay termination value is selected at 100 units or 1.00 unit; hence, the value read will be represented as a percentage or mole fraction. Thus, according to this invention no calculations to determine the percentage or mole fraction need be made.

Accordingly, it is an object of this invention to provide an apparatus capable of sensing a plurality of values and determining the quantitative relationship between the individually sensed values and the sum of the plurality of values.

Another object of this invention is to provide apparatus to integrate a quantity vs. time relationship and compare an individually integrated value with the sum of a plurality of said values.

Other objects, advantages, and features of this invention will be readily apparent to those skilled in the art from the following description, drawing, and appended claims.

With reference to the attached figure, there is indicated a schematic view of one embodiment of the inventive apparatus.

With particular reference to the attached figure, there is indicated signal detection and generation means 1. Signal detection and generation means 1 can comprise any means capable of detecting a signal and generating a response thereto. In one embodiment, signal detection and generation means 1 comprised a chromatographic analyzer to which a binary gaseous mixture was introduced. Specifically, the chromatographic analyzer as disclosed in U.S. 3,038,662 would be satisfactory for this use.

There is additionally indicated operational amplifier 2. Operational amplifier 2 can comprise any amplifier capable of receiving an output signal from signal detection and generation means 1 and amplifying said signal to a sufficient amplitude to provide for proper operation and readout. In one embodiment, a Burr-Brown, Model 1506, operational amplifier was entirely satisfactory. Additionally, there are indicated an integration and storage means which, in one embodiment, comprised operational amplifiers 3, 4, and 5, together with capacitors 18, 19, and 20 and resistors 9, 12, and 15. It is to be understood that the integration and storage means can comprise any device that will integrate and store a value and will otherwise function satisfactorily in the invention. These operational amplifiers can comprise any amplifier capable of properly manipulating the signal impressed thereon according to this invention. In a preferred embodiment, an amplifier was selected for its low drift characteristics. Low drift is desired so that the value stored in the capacitors will not leak out before the decay is started. Specifically, a Philbrick Model P2A, manufactured by the Philbrick Electronics Corp., was entirely satisfactory in one embodiment.

There is additionally indicated recorder 6. This recorder can comprise any recorder capable of recording an output signal from the amplifier to which it is connected. Specifically, a Strip Chart Recorder of the type manufactured by the Minneapolis Honeywell Corporation was entirely satisfactory in one embodiment.

Additionally, there is indicated circuit decay control means 7. Circuit decay control means 7 can comprise any means capable of sensing a first constant signal of predetermined magnitude and generating a response capable of actuating a switch when the magnitude of a second time-varying signal is equal to that of the first constant signal. Particularly suitable for this service is a High Speed Differential Comparator, such as the Fairchild Linear Integrating Circuit, Model HA710C, manufactured by the Fairchild Electronics Corporation.

With respect to resistors 10, 13, 16, and 17, it is to be noted that the invention will operate properly only when the aforementioned resistors are sized to the expected input.

According to this invention, the value of resistors 10 and 13 with respect to the combined value of resistors 16 and 17 must be within about 4 percent of the value of each individual response with respect to the sum of the total of responses. Stated another way, the invention will operate properly only when the ratio of component A to the total falls without about $\pm 2$ percent, or other deviation if less accuracy is demanded, of the ratio of resistor 10 to the sum of resistors 16 and 17.

As an example, if the ratio of resistor 10 to the sum of resistors 16 and 17 is 40 percent, the invention will function properly if the percentage of component A is $\pm 2$ percent of 40 percent or within the range of 38 to 42 percent of the sum of components A and B. Of course, resistor 13 must be sized in the same manner as resistor 10.

Since the only requirement as to sizing the resistors is to provide a resistor ratio that is within $\pm 2$ percent of the output to be analyzed, resistors 10, 13, 16, and 17 could be fixed resistors. A more convenient and more practical method, however, is to use potentiometers for resistors 10, 13, 16, and 17. When potentiometers are used, potentiometers 10 and 16 would be set to the same value and resistors 13 and 17 would be set to the same value. Of course, the value of resistors 10 and 13 with respect to the sum of resistors 16 and 17 must be within about $\pm 2$ percent of the values desired to be measured.

The sizing function is necessary because the voltages that are to be stored in the integration and storage means must correctly reflect the proportion of each component in the plurality.

To achieve this, the same voltage for one component must be stored in two separate integration and storage means. To store the same voltage value in both integration and storage means demands that the voltage drop, i.e. integral of the current flow with respect to time, from the signal detection and generation means to the integration and storage means be substantially equivalent. As an example, with similar integrating capacitors the voltage representing component A must have the same voltage drop, i.e. current flow, through resistor 10 as through resistor 13. This is achieved by selecting resistors of the same value. Additionally, the voltage representing component B must have the same voltage drop through resistors 16 and 17.

The sizing function is also necessary because when the voltages from components A and B are allowed to decay the proportion originally charged in integration and storage means 1 and 3 must be maintained during the decay period. Since the resistors have been sized according to the aforementioned method, the voltage in integration and storage means 1 and 2 will decay through resistors 10 and 13, first, and then the combined voltages will decay through the combined values of the individual resistors as represented by resistors 16 and 17.

In summary, the resistors must be sized so that the voltages that are to be stored in two integration and storage means are substantially equivalent for all components in the plurality. Additionally, the sized resistors are necessary so as to preserve the proportion between the original voltages during the decay period. Failure to size the resistors results in erroneous results from the apparatus.

Resistors 10, 13, 16, and 17 can comprise any resistor that will provide the necessary value of resistors; however, due to the aforementioned tolerance of $\pm 2$ percent, a wire wound resistor was used in a preferred embodiment.

Resistors 9, 12, and 15 are included in this embodiment to stabilize amplifiers 3, 4, and 5, respectively, by switching the resistor across the amplifier with switches 22, 25, and 28. When the time between the insertion of responses into the circuit is more than a few minutes the amplifiers will tend to drift and release some of the value stored in the capacitor. If the time between insertion of responses in the circuit is within, say five minutes, most commercially available operational amplifiers will exhibit little drift and will operate satisfactorily; however, when the time is much greater, say thirty minutes, even good quality amplifiers will tend to drift. To overcome the problem of drift, as soon as the voltages are charged in the capacitors, switches 22, 25, and 28 are thrown so as to place resistors 9, 12, and 15 across the amplifier. This results in the isolation of capacitors 18, 19, and 20; hence, there is no voltage loss. As a result of the resistors being switched across the amplifier, the amplifier is allowed to operate with a gain of 1 and will not saturate and drift.

The optional embodiment of the resistors and switch can be used if the amplifiers that are chosen for use will drift significantly over the period between responses put into the circuit. Obviously, the need for this optional feature must be viewed in reference to the expected time between responses and the quality of the amplifier selected by the user.

Capacitors 18, 19, and 20 can comprise any capacitors that will decay according to the aforementioned method. Due to the desirability of using the invention to run a series of analysis, a preferred embodiment uses capacitors with a low hysteresis characteristic.

Resistors 8, 11 and 14 are shown in FIGURE 1, also. These resistors are necessary to provide for the decay of the voltage stored in capacitors 18, 19, and 20. According to this invention, the time decay characteristic of all RC circuits must be equivalent. This necessarily means that the resistors 8, 11, and 14 and capacitors 18, 19 and 20 must be sized accordingly. While other circuit configuration and switching features can be employed in the RC circuits, it is essential that the time decay characteristics be substantially equivalent and that the voltage be switched so as to decay through the decay control means. It is to be understood than other means besides resistors 8, 11, and 14 and switches 21, 24, and 27 could be adapted to discharge through the decay control means a value stored in the attached integration and storage means.

The functioning of the above recited apparatus will now be described. In one embodiment, signal detection and generations means 1 comprises a chromatographic analyzer. A binary gaseous mixture is introduced into said chromatographic analyzer, whereupon the components are separated by operation of the chromatographic analyzer. Emergence of the first of the two gaseous components generate a DC electrical signal which is then conducted to operational amplifier 2 for amplification. As well known by those learned in the art, the gaseous output, and hence, electrical output in this case, of a chromatographic analyzer represents a Gaussian distribution curve when the quantity of exiting material is plotted against time. This signal representing a Gaussian curve for the first of the two components is, as previously described, then conducted to operational amplifier 2 wherein said signal is amplified and impressed upon the indicated circuit. Prior to the introduction of the binary gaseous mixture into the chromatographic analyzer, switch 21 is opened, switch 22 is rotated to A position, switch 23 is closed, switches 24, 25, 26, 27, 30, 31, and 32 are opened, switch 29 is closed, and switch 28 is rotated to A position. As the aforementioned amplifier signal existing from operational amplifier 2 is impressed upon the connected circuit, the positioning of the aforementioned switches causes the chromatographic output voltage, representing a Guassian curve, to flow through sized resistors 10 and 16 to be integrated in operational amplifiers 3 and 5, and the result of the integration, representing the area under the Gaussian curve, is charged in capacitors 18 and 20, respectively. Resistors 10 and 16, along with resistors 13 and 17 are sized according to the method previously explained. Since the amount of the component is proportional to the area under the Gaussian curve for that particular component, the amount of said component can be determined by comparing the area under the Gaussian curve for the individual component, determined by the integration function of operational amplifiers 3, 4, and 5 and the attached circuit, with the sum of the area under the Gaussian curves for each component of the mixture. After the voltage, representing the area under the Gaussian curve for the first component, is charged in capacitors 18 and 20, switches 22 and 28 are rotated to the B position, switch 23 is opened, switch 25 is rotated to the A position, switch 26 is closed, switch 29 is opened, and switch 30 is closed. Switches 22 and 28 are rotated to the B position to eliminate amplifier drift, as has been previously explained. This switching operation occurs at a time antecedent to the first component exiting from the chromatographic analyzer but before any of the second component exits from the chromatographic analyzer.

After the aforementioned switching operation is conducted, the second component exits from the chromatographic analyzer. This signal, representing the second component, is manipulated in the same manner as the signal representing the first component by amplifying in operational amplifier 2 and impressing upon the attached circuit. As a result of the aforementioned switching operation, the voltage representing the sum of the area under the Gaussian curve is integrated in operational amplifier 5 and the value representing the area under the Gaussian curve is charged in capacitor 19 and the same value is determined in operational amplifier 3 and charged in capacitor 20. Thus, acording to the operation of this invention, capacitor 18 is charged with a voltage representing the area under the Gaussian curve for the first component, capacitor 19 is charged with a voltage representing the area under the Gaussian curve for the second component, and capacitor 20 is charged with a voltage representing the sum of the charges in capacitors 18 and 19, which in turn represents the sum of the area under the Gaussian curve for both components of the mixture. According to the operation of this invention, any number of individual responses can be sensed and their proportionate part determined by this invention. As those learned in the art will recognize, this can be accomplished by merely adding additional integrating and storing circuit units, such as the integrating and storing circuit associated with operational amplifiers 3 and 4. Regardless of the number of responses to be sensed, only one operational amplifier, such as operational amplifier 5, would be required. Of course, additional resistors, associated connections, and switches would have to be added to supplement resistors 16 and 17, and switches 28 and 29. In one embodiment, a chromatographic output was processed; however, it is fully within the scope of this invention to determine the proportion that any individual component of a response which can be plotted on a two-dimensional coordinate system bears to the total of the several components.

After the response from the second component is charged in the appropriate capacitor, as previously explained, switches 21, 23, 24, 26, 27, 29, and 30 are closed. As those learned in the art will readily recognize, immediately upon closing switch 31, which according to this invention will ground the entire circuit across switch 31, capacitors 18, 19, and 20 will discharge against resistors 8, 11, and 14, respectively, in accordance with time decay characteristics for an RC circuit. This time decay is, as has been previously recited, a consequence of circuit decay control means 7 permitting the charged voltage to discharge against reference potential. According to the operation of this invention, capacitors 18, 19, and 20 are sized to resistors 8, 11, and 14, by methods well known in the art, to provide a time decay characteristic of from 1 to 12 seconds. In one embodiment, a time decay characteristic of 10 seconds proved entirely satisfactory.

In this embodiment, the decay was allowed to pass through resistors 9, 12, and 15; however, the decaying voltage could be switched so as not to flow through said resistors by rotating switches 22, 25, and 28 to the A position. This, however, necessitates a separate switching operation, but would prove satisfactory. As has been previously noted, the decaying voltage is conducted through resistors 10, 13, 16, and 17 which have been sized to the expected chromatographic output. Thus, the original proportions maintained throughout the decay period have not been altered by passage through the sized resistors.

According to the operation of this invention, circuit decay control means 7 is a means capable of actuating a switch when the voltage, decaying according to the aforementioned time decay characteristics, falls to a value equal to that of the sensed constant voltage $K_1$ applied against reference potential. Since the time decay characteristics for each of the aforementioned sets of capacitors and resistors are identical, and the decaying voltage flows through sized resistors, the time decay characteristics will not alter the relationship between the individual components charged in capacitors 18 and 19 with respect to the value charged in capacitor 20 representing the sum of the values in capacitors 18 and 19. According to this invention, the value $K_1$ is selected at any desired level. If the proportion that the individual component bears to the total is desired to be expressed in terms of percentage, a value of $K_1$ is selected at 100. In one embodiment, the values of individual components in a binary gaseous mixture are expressed in mole fraction; hence, the value of $K_1$ is selected to be 1.00. As the time decay voltage passing through switch 31 and being sensed by circuit decay control means 7, falls to a value equal to that selected for $K_1$, circuit decay control means 7 causes switches 31, 21, 24, and 27 to be opened. At this point, the charge in capacitor 20 represents the predetermined value selected for $K_1$ and the values in capacitors 18 and 19 represent the proper proportion of the individual components due to the aforementioned proportional decay. At this point, switch 32 is rotated to the A position and the charge in capacitor 18 is sensed and recorded. Switch 32 is subsequently rotated to the B position, whereupon the value of the charge in capacitor 19 is sensed and recorded. Since the sum of the values in capacitors 18 and 19, as represented in capacitor 20, is allowed to decay proportional with capacitor 20 and the voltage is conducted through sized resistors, the mole fractions of the first and second components are directly displayed in recorder 6.

It is to be understood that in place of circuit decay control means 7 and the various switches any means could be used that would dissipate voltage in the capacitor at the same rate and terminate the dissipation when the level in the capacitor carrying the sum of the individual values falls to a predetermined value.

This invention is thus broadly applicable to determining the proportion that a response capable of being plotted on a two-dimensional coordinate system bears to the sum of a plurality of responses of which the individual response is a part.

Various modifications on this invention can be made in view of the foregoing disclosure and appended claims without departing from the spirit or scope thereof.

What is claimed is:

1. Apparatus for determining the proportion a first and second response bears to the sum of said responses comprising:

(a) signal detection and generator means capable of detecting a signal and generating responsive thereto a first and second time separated electrical response, said generator having an output lead;

(b) first resistor, first switch, and first integration and storage means serially connected to said generator lead; means positioned within said integration and storage means adapted to discharge through first switch a value stored in first integration and storage means;

(c) third resistor substantially equivalent in value to said first resistor, third switch, third integration and storage means, said elements serially connected to said generator lead; said generator generating a first response, said first and third switches closing so as to conduct said response through first and third resistors, first and third switches and into said first and third integration and storage means wherein said first response is integrated and the integrated value stored in said first and third means, said first and third switches then opening, said first and third integration and storage means constructed in the range to dissipate at a time subsequent the stored integrated signal at an equivalent predetermined rate when said first and third switches are closed and connected with ground potential, said dissipation from first means flowing to reference potential through said first switch, generator lead, third switch, and through said third means to an attached decay control means, said dissipation of said first stored response from third means flowing to reference potential through said decay control means;

(d) second resistor, second switch, and second integration and storage means, serially connected to said generator lead; means positioned within said integration and storage means adapted to discharge through said second switch a value stored in second integration and storage means;

(e) fourth resistor substantially equivalent in value to said second resistor, said fourth resistor value bearing substantially the same relationship to the third resistor value as does the value of the second response to the value of the first response; fourth switch, said fourth switch and fourth resistor serially connected between said generator lead and said third integration and storage means, said generator generating a second response, said second and fourth switches closing so as to conduct said second response through second and fourth resistors, second and fourth switches and into said second and third integration and storage means wherein said second response is integrated and the integrated value stored in said second and third means, said second and fourth switches then opening, said third means then containing the sum of the first and second integrated values, said second integration and storage means constructed in the range to dissipate the stored integrated signal at the same rate as third integration and storage means when said second and fourth switches are closed and connected with reference potential, said dissipation from second means flowing to reference potential through said second switch, said generator lead, fourth switch and through said third means to an attached decay control means, said dissipation of said second stored response from third means flowing to reference potential through said decay control means;

(f) circuit decay control means connected by fifth switch to said third integration and storage means, said third means containing the sum of the first and second integrated response values, means positioned within said third integration and storage means adapted to discharge through switch five to said decay control means the value stored in said third means, said third integration and storage means constructed in the range so that when first, second, third, fourth, and fifth switches are shut said dissipation means positioned within said integration and storage means will allow the stored value in first, second, and third means to dissipate at the same rate against ground potential, the dissipation from first and second means flowing through said generator lead, third means, and decay control means, the dissipation from third means flowing through said decay control means, said decay control means further constructed to open fifth switch when the response from said third means representing the dissipated value of the first and second integrated values fall to a predetermined level, the opening of said fifth switch terminating the dissipation but the relationship of the first, second, and third integrated values being preserved throughout the dissipation period; and (g) recorder connected to said first and second means recording the dissipated values remaining in first and second means after switch five is opened, said remaining values in first and second means also remaining proportion to one another during the dissipation period, said recorder thereby directly recording the proportion each response represents to the predetermined level selected for opening switch five.

2. The apparatus of claim 1 wherein said integration and storage means comprises a capacitor connected across an operational amplifier; wherein said dissipation means comprises a resistor in parallel with said capacitor and a switch positioned in the parallel resistor capacitor connection; wherein said signal detection and generation means comprises a chromatographic analyzer.

3. Apparatus for normalizing a pair of sequential signals which comprises first, second, and third condensers;

switching means constructed and arranged to charge the first sequential signal to said first and third condensers, and the second sequential signal to said second and third condensers, whereby the charge on the third condenser represents the sum of said signals; first, second, and third resistors sized to reduce the charges on the respective condensers by a constant factor per unit of time; means to sense the potential across said third condenser; second switching means connected to said resistors, said condensers and said sensing means, said second switching means being arranged to connect said resistors in parallel with the respective capacitors after they have been charged by said signals, whereby the charge on said capacitors is reduced, said second switching means thereafter being actuated by said sensing means to disconnect said resistors from the capacitors when the charge on said third capacitor falls to a predetermined value, whereby the charges on the first and second condensers are normalized, and means indicating the values of the normalized signals on the first and second condensers.

References Cited

UNITED STATES PATENTS 3,243,585    3/1966    Escobosa    235—193 X
3,280,319    10/1966    Nathan    235—193 X MALCOLM A. MORRISON, *Primary Examiner.*

J. F. RUGGIERO, *Assistant Examiner.*

U.S. Cl. X.R.

235—183